May 20, 1958

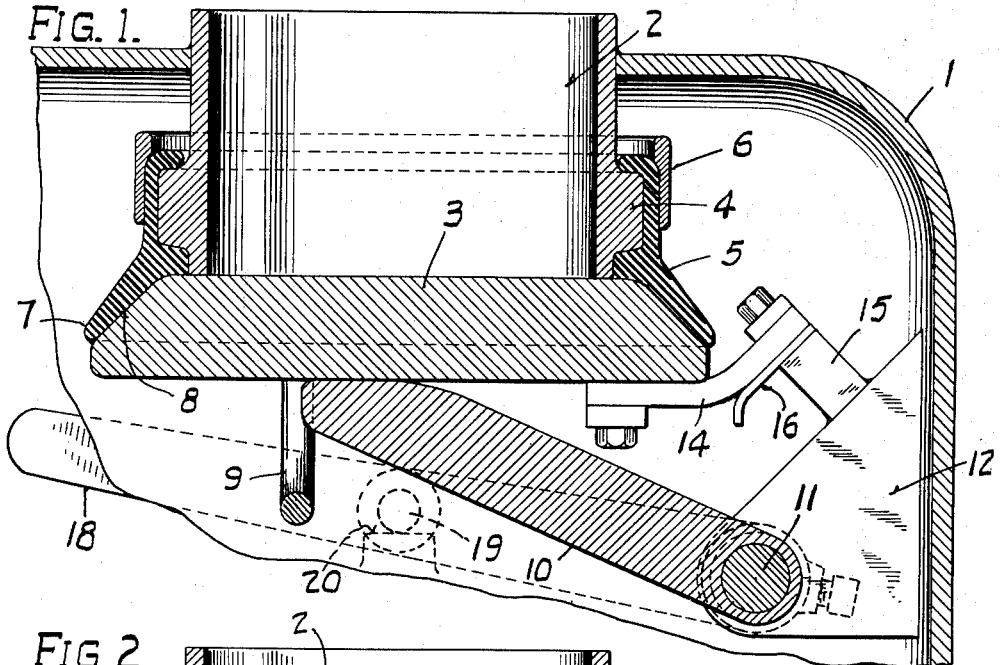
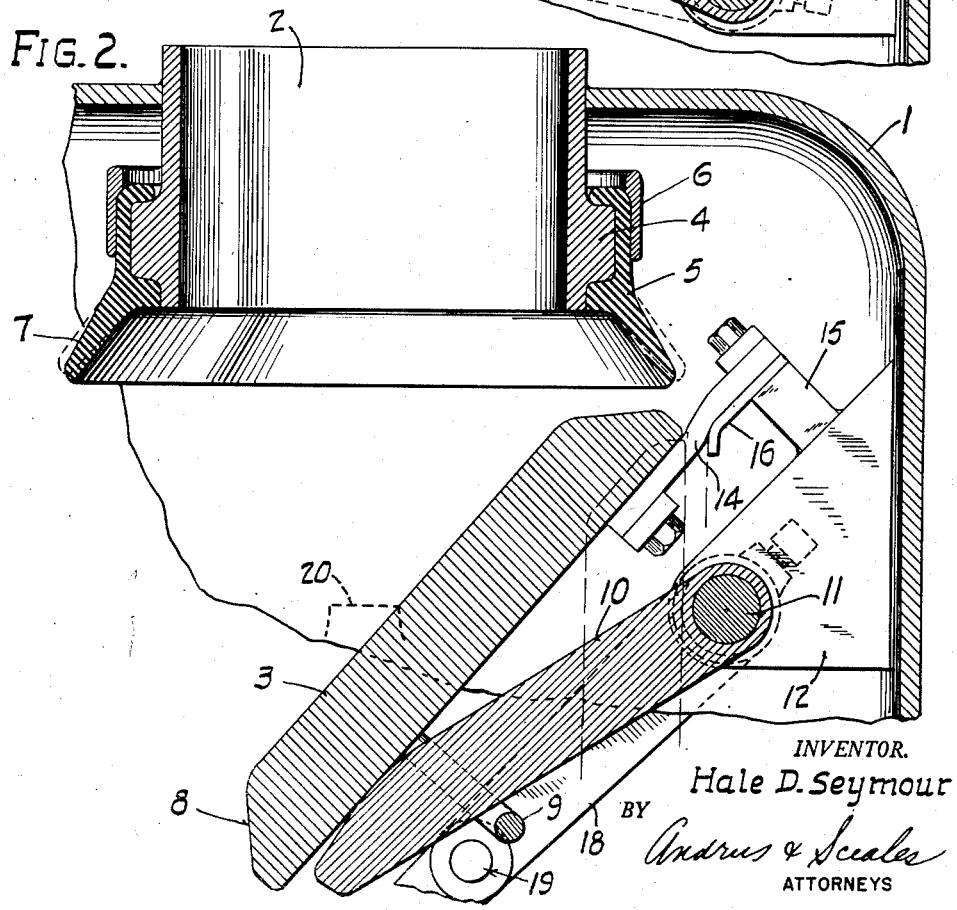

H. D. SEYMOUR 2,835,269

VESSEL CLOSURE

Filed April 10, 1953

INVENTOR.
Hale D. Seymour
BY
ATTORNEYS

United States Patent Office 2,835,269
Patented May 20, 1958

2,835,269

VESSEL CLOSURE

Hale D. Seymour, Western Springs, Ill., assignor to A. O. Smith Corporation, Milwaukee, Wis., a corporation of New York Application April 10, 1953, Serial No. 347,982

3 Claims. (Cl. 137—467)

This invention relates to pressure vessel closures of a type peculiarly adapted for use on vessels in which are disposed fluids containing suspended solids.

Briefly the invention comprises a closure valve body extending through the wall of the pressure vessel. A sealing member comprising a flexible lip is firmly secured around the inner extremity of the valve body. A hinged closure valve disc depends from the inner wall surface of the vessel and is received against the inner extremity of the valve body by the flexible lip of the seal to effect closure. To open and close the valve, the valve disc is actuated by a lever arm connected to a shaft. The shaft extends to the exterior of the vessel through a stuffing box where turning means are provided for easy operation of the opening and closing mechanism.

An object of the invention is to provide the internal closure unit with simple external means for operating the closure valve.

Another object is to provide a closure which is self-opening when the pressures have been reduced to near atmospheric.

Another object of the invention is to provide a closure peculiarly adapted to working with fluids containing suspended solids.

These and other objects of the invention will be clear from the following description when considered in connection with the accompanying drawings in which:

Figure 1 is a sectional view through the wall of the vessel and the closure unit of the invention as the unit appears when sealing is effected;

Fig. 2 is a view similar to Figure 1 showing the closure unit in its open position.

Figure 3:
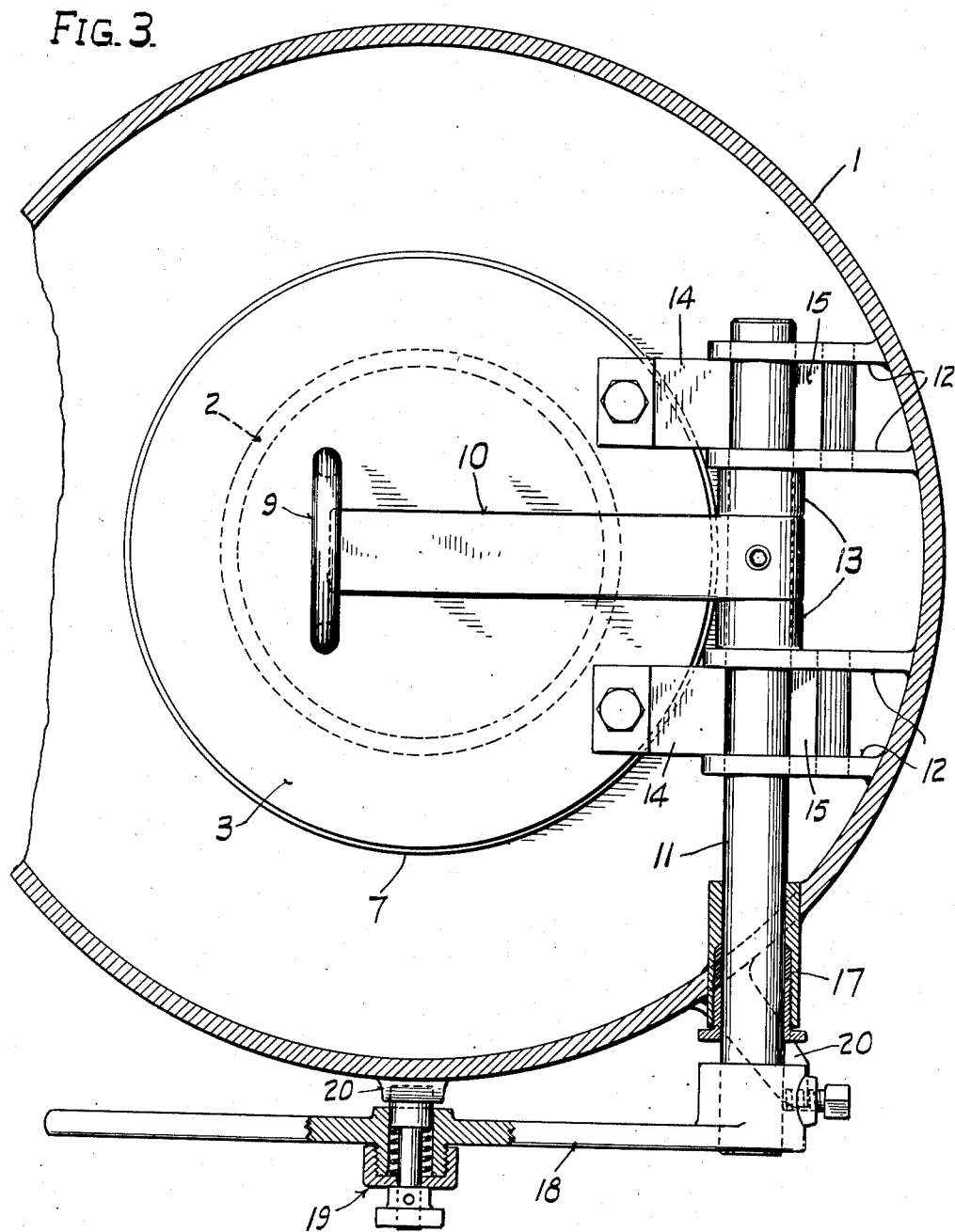
Fig. 3 is a sectional view through the wall of the pressure vessel transversely of Figure 1.

In the drawings there is shown a pressure vessel 1 adapted to contain fluids under pressure. To provide access to the interior of the vessel a closure valve body 2 open to the atmosphere at one end is disposed in a suitable opening in shell 1 and is adapted to be closed at the end disposed internally of shell 1 by hinged closure valve disc 3.

The valve body 2 projects inwardly of shell 1 and is formed with an external flange 4 adjacent its inner end. An annular sealing member 5 made of rubber or other resilient material is disposed about the inner end of valve body 2. Sealing member 5 is provided with an internal annular groove which fits snugly over the external flange 4. Annular sealing member 5 may be further held in place by a retaining ring 6. However, where the sealing member 5 is provided with a snug fit, it is conceivable that the retaining ring 6 may be omitted.

The sealing member 5 is formed with an annular flexible lip 7 projecting inwardly from shell 1 and outwardly from the valve body 2 at an angle approximating 45° from the axis of valve body 2.

The valve disc 3 is adapted to bear against the inner end of valve body 2 and is provided with a frustro-conical edge portion 8 adapted to engage the inner surface of lip 7 when the disc 3 is in engagement with valve body 2. The edge portion 8 has a degree of taper slightly greater than the angle of lip 7, such that when closure is effected between lip 7 and disc 3, the lip 7 is forced to expand as shown by the dotted lines in Fig. 2 to provide a tight sealing engagement therebetween which is maintained under pressure conditions.

To actuate valve disc 3, the trailing surface of the valve disc 3 is provided with an inverted U-shaped stop member 9. The stop member 9 is engaged by a lever 10 extending from a shaft 11 which is rotatably secured between pairs of lugs 12. Lugs 12 are secured edgewise to shell 1 by welding or otherwise. The lever 10 is secured to shaft 11 by a set screw or the like disposed between the pairs of lugs 12. To maintain shaft 11 and lever 10 in their same position relative to valve disc 3, spaced rings 13 are provided between the lever 10 and the adjacent lugs 12.

Secured to valve disc 3 by bolts or otherwise are a pair of hinges 14 made preferably of reinforced rubber. At their outer end, the hinges 14 are secured to a pair of hinge posts 15 which are attached to the respective pairs of lugs 12. To prevent the hinges from assuming positions which may cause them to be damaged, hinge guides 16 are provided on posts 15 directly below the hinges 14.

In order to operate valve disc 3 from a point external of shell 1, the shaft 11 extends to the outside of shell 1 through a stuffing box 17 disposed in a suitable opening in shell 1. A lever arm 18 is secured to shaft 11 by set screw or otherwise externally of shell 1 to provide means for rotating the shaft 11 and effecting a relative movement of valve disc 3. Any other suitable means might be utilized to effect rotation of shaft 11.

To maintain valve disc 3 in its extreme positions open and closed lever arm 18 is provided with a spring-loaded pin locking mechanism 19 adapted to engage suitably spaced projections 20 external of shell 1.

To effect closure of the open valve, the spring-loaded pin of locking mechanism 19 on lever arm 18 is retracted to clear the raised projection 20 which maintained the valve disc 3 open. After the pin is raised to clear projection 20 the lever arm 18 is moved in the direction of closure and a similar movement is imparted to lever 10 through shaft 11. Lever 10 acting on the trailing surface of valve disc 3 causes the disc to engage with the lip 7 of sealing member 5 and seat against the inner end of valve body 2. To maintain this closed position before the pressure vessel is subjected to pressure the pin of locking mechanism 19 on lever arm 18 is secured behind the second of the projections 20. The vessel may now be subjected to the pressures intended.

Before exhausting the pressure vessel, the spring-loaded pin of locking mechanism 19 may be retracted to clear its holding projection 20. Thus, upon exhausting the vessel and as the pressure therein approaches atmospheric pressure, the valve will be self-opening as the pressure exerted by expanded lip 7 against the valve disc 3 together with the gravity bias exerted by the disc overcomes the pressure inside the vessel. The lever arm 18 may then be locked in position behind the projection 20 to maintain the disc open. The stop member 9 is provided to limit the free swing of disc 3 in order to prevent damage to the various parts.

This simple closure structure is particularly well suited to working with fluids containing suspended solids. If any of the solids should become trapped between the disc and the flexible lip, the lip will merely accommodate such matter and the seal remains unaffected. Because of the original expansion of the flexible lip on closure, an excellent initial seal is effected. Under the working loads, this seal is maintained.

Various embodiments of the invention may be employed within the scope of the following claims.

I claim:

1. An internal closure device for a pressure vessel, comprising a hollow generally cylindrical closure body secured within an opening in the wall of the vessel with the inner end portion of the body projecting inside the vessel a substantial distance and the body being open to the atmosphere at the outer end and the inside of the vessel at the inner end, an annular sealing member secured to the outer surface of the closure body adjacent the inner end of the body, a flexible lip on said sealing member projecting angularly from the inner end portion of the closure body and free of said body, a closure disc disposed inside the vessel and adapted to be actuated into and out of engagement with the inner end of the closure body to open and close the same, said disc having a body engaging surface extending radially outward beyond the periphery of the closure body and further having a circumferential tapered surface provided on the disc and having an angle of taper greater than the angle of projection of said lip to expand the lip outwardly as the disc is tightened against the end of the closure body and thereby effect a tight seal with said lip.

2. An internal closure device for a pressure vessel, comprising a generally cylindrical hollow closure valve body secured within an opening in the wall of said vessel with the inner end portion of the valve body projecting inside the vessel a substantial distance and the body being open to the atmosphere at the outer end and to the inside of the vessel at the inner end, an annular sealing member secured to the outer surface of the valve body adjacent the inner end thereof, a flexible lip projecting angularly outwardly to a normal position from said sealing member and free of said valve body, a frusto-conical disc member disposed inside the vessel and adapted to seal against the inner extremity of the valve body with the frusto-conical surface disposed outwardly beyond the periphery of the valve body and bearing against the inner surface of said lip, the frusto-conical surface of said disc member being provided with a sufficient degree of taper to expand the projecting lip when the disc member is moved into engagement with the lip and seats on the inner end of the valve body, flexible hinge members connected to the wall of the vessel and supporting the disc member, means to guide said hinge members, and means to actuate said disc member on said hinge members into engagement with said lip, said lip tending to contract and resume its normal position and thereby assist to effect disengagement between lip and disc member after the working load in the vessel is reduced below a given pressure.

3. An internal closure device for a pressure vessel, comprising a hollow cylindrical closure body secured within an opening in the wall of the vessel with the inner end portion of the body projecting inside the vessel a substantial distance and the body being open to the atmosphere at the outer end, a circular disc member disposed inside the vessel and adapted to engage the inner extremity of the closure body, the engaging surface of the disc member extending outwardly beyond the periphery of the closure body and the circumferential surface of the disc member tapering outwardly from the engaging surface, an annular sealing member secured to the outer surface of the closure body adjacent the inner end of the body for engagement by the portion of the engaging surface of the disc member extending outwardly beyond the periphery of the closure body, and a flexible lip on said sealing member projecting angularly from the sealing member to receive the circumferential tapered surface of the disc member with the angle of projection of the lip being less than the angle of taper of the circumferential surface of the disc member whereupon expansion of the lip is effected upon closure to attain a tight seal between the lip and the disc member.

References Cited in the file of this patent

UNITED STATES PATENTS

| | | |
|---|---|---|
| 639,218 | Dempster | Dec. 19, 1899 |
| 755,284 | Dixon | Mar. 22, 1904 |
| 1,636,461 | Colburn | July 19, 1927 |
| 1,947,071 | Walton | Feb. 13, 1934 |
| 1,948,628 | Penick | Feb. 27, 1934 |
| 2,002,672 | Melott | May 28, 1935 |
| 2,112,630 | Marshall | Mar. 29, 1938 |
| 2,446,767 | Hanes | Aug. 10, 1948 |

FOREIGN PATENTS

| | | |
|---|---|---|
| 900,318 | France | of 1945 |